US011276245B2

(12) United States Patent
Han et al.

(10) Patent No.: US 11,276,245 B2
(45) Date of Patent: Mar. 15, 2022

(54) BODY SHAPE DISPLAY METHOD FOR MODELING OF CLOTHING

(71) Applicant: Z-EMOTION CO., LTD., Busan (KR)

(72) Inventors: Dong Soo Han, Busan (KR); Dong Wook Yi, Busan (KR)

(73) Assignee: Z-EMOTION CO., LTD.

(*) Notice: Subject to any disclaimer, the term of this patent is extended or adjusted under 35 U.S.C. 154(b) by 0 days.

(21) Appl. No.: 17/050,077

(22) PCT Filed: Nov. 28, 2019

(86) PCT No.: PCT/KR2019/016646
§ 371 (c)(1),
(2) Date: Oct. 23, 2020

(87) PCT Pub. No.: WO2021/107205
PCT Pub. Date: Jun. 3, 2021

(65) Prior Publication Data
US 2021/0174603 A1   Jun. 10, 2021

(51) Int. Cl.
*G06T 19/20* (2011.01)
*G06T 17/00* (2006.01)
(Continued)

(52) U.S. Cl.
CPC .......... *G06T 19/20* (2013.01); *G06F 3/04847* (2013.01); *G06Q 10/101* (2013.01);
(Continued)

(58) Field of Classification Search
CPC ..... G06T 19/20; G06T 17/00; G06T 2200/24; G06T 2219/2016; G06T 2219/2021;
(Continued)

(56) References Cited

U.S. PATENT DOCUMENTS 10,290,041 B2   5/2019  Ko
10,446,054 B2 * 10/2019  Lamoncha ........... A43B 3/0005
(Continued)

FOREIGN PATENT DOCUMENTS

JP    2018524738 A    8/2018
JP    2018180989 A    11/2018
(Continued)

OTHER PUBLICATIONS

International Search Report (PCT/ISA/210) and Written Opinion (PCT/ISA/237) dated Aug. 20, 2020, by the Korean Patent Office as the International Searching Authority for International Application No. PCT/KR2019/016646.

*Primary Examiner* — William A Beutel
(74) *Attorney, Agent, or Firm* — Buchanan Ingersoll & Rooney PC

(57) ABSTRACT

A method of displaying a first body shape according to a body size input by a user and a second body shape according to a recommendation body size includes receiving a first body size for modeling of clothing from the user; determining a second body size similar to the first body size by using the first body size; generating a first body shape based on the first body size, and generating a second body shape based on the second body size; and displaying the first body shape and the second body shape.

5 Claims, 10 Drawing Sheets

(51) Int. Cl.
*G06F 3/04847* (2022.01)
*G06Q 10/10* (2012.01)

(52) U.S. Cl.
CPC .......... *G06T 17/00* (2013.01); *G06T 2200/24* (2013.01); *G06T 2219/2016* (2013.01); *G06T 2219/2021* (2013.01)

(58) Field of Classification Search
CPC ....... G06T 17/005; G06T 17/05; G06T 17/10; G06T 17/20; G06T 17/205; G06T 17/30; G06F 3/04847; G06Q 10/101
See application file for complete search history.

(56) References Cited

U.S. PATENT DOCUMENTS

| | | | |
|---|---|---|---|
| 2015/0161707 A1* | 6/2015 | Wilkinson | G06Q 30/0631 705/26.7 |
| 2018/0144187 A1 | 5/2018 | Xu | |
| 2018/0150898 A1* | 5/2018 | Ko | G06F 16/9535 |
| 2019/0087511 A1* | 3/2019 | Taniguchi | G06F 30/17 |
| 2020/0043085 A1* | 2/2020 | Sekiyama | G06Q 30/0621 |

FOREIGN PATENT DOCUMENTS

| | | |
|---|---|---|
| KR | 101635710 B1 | 7/2016 |
| KR | 101974573 B1 | 5/2019 |
| KR | 101995277 B1 | 10/2019 |

* cited by examiner

Body Size fix
☐ skinny ——●—— fat
611 — ☐ small bust ————●— big bust
☐ small hip —●——— big hip
☑ short ═══○═══ tall Reset

BODY SHAPE DISPLAY METHOD FOR MODELING OF CLOTHING

TECHNICAL FIELD

The present disclosure relates to a body shape display method for modeling of clothing, and more particularly to, a method of displaying a first body shape according to a body size input by a user and a second body shape according to a recommendation body size.

BACKGROUND ART

As the standard of living gradually increases, selection of clothing is an important part as a way to express one's individuality in addition to solving basic food, clothing and shelter. People wear or own clothing that suits them or in their preferred colors and designs such that they enhance their external image as well as their self-satisfaction.

Clothing-related business that designs, manufactures, and sells clothing is expanding widely through Internet shopping malls which are active with the recent development of the Internet, in addition to the existing offline. In particular, as young people who are interested in clothing have become more prominent in their social advancement, such clothing-related business is a business field that is expected to develop continuously in the future.

Upon briefly reviewing clothing production process currently being conducted offline, first, designers create patterns by designing clothing they intend to release in the future. Then, designers sew these patterns to produce samples. When samples are produced, designers evaluate the design through an in-house meeting (exhibition), and request the production of samples of designs that are consumers' reaction, that is, expected to be highly commercial from clothing makers.

According to the related art, design work for clothing to be produced in the future, pattern production according to the design, and sewing work of connecting the produced patterns to each other are all performed manually. When design work, pattern production, and sewing work are performed manually, the manufacturing cost of the product increases because a large number of manpower must spend a lot of time working.

In addition, in the case of partially modify a high quality clothing design, because the above-described process must be repeated countless times by modifying the pattern, there is a problem that the working time for product development increases. Although methods of producing patterns on a computer by computerizing this process are partially used, to accurately evaluate the finished clothing, there is still the inconvenience of manually completing the prototype.

DESCRIPTION OF EMBODIMENTS

Technical Problem

Provided is to allow a user to more easily perform modeling of clothing by generating a body shape that is close to a shape of the actual human body.

In particular, provided is to provide a body size that is closes to the actual human body size among body sizes input by a user through comparison with a plurality of previously obtained human body models.

Technical Solution to Problem

A method of displaying a first body shape according to a body size input by a user and a second body shape according to a recommendation body size includes receiving a first body size for modeling of clothing from the user; determining a second body size similar to the first body size by using the first body size; generating a first body shape based on the first body size, and generating a second body shape based on the second body size; and displaying the first body shape and the second body shape.

The determining of the second body size may include comparing sizes of a plurality of human body models with the first body size and selecting a human body model whose size similarity to the first body size satisfies a predetermined condition from among the plurality of human body models; and determining a body size of the selected human body model as a second body size.

The first body size may include one or more size items that determine a shape of the body, the receiving of the first body size may include receiving a size according to the one or more size items; and receiving a degree of freedom for modification of the one or more items. The degree of freedom for modification may be a degree of modifiability of each size of the one or more items when determining the second body size, and the determining of the second body size may include determining the second body size by referring to the size according to the one or more size items and the degree of freedom for modification.

The first body size may include one or more size items that determine a shape of the body, and the receiving of the first body size may include providing an interface for setting each of the one or more size items.

The interface may include a slider interface capable of adjusting the size with respect to each of the one or more size items according to a positon movement of a knob, and the receiving of the first body size may include, according to the position movement of the knob with respect to any one of the one or more size items, updating and providing a recommendation movement range of the knob on a slider interface with respect to remaining size items.

At this time, the recommendation movement range of the knob may be determined based on a plurality of human body models and a size value determined with respect to a corresponding item according to a position movement of the knob with respect to any one of the items.

The displaying may include at least partially overlapping and displaying the first body shape and the second body shape while displaying the first body shape in a first display format and displaying the second body shape in a second display format.

The displaying may include matching and displaying a central axis of the first body shape and a central axis of the second body shape.

The determining of the second body size may include determining a plurality of second body sizes, the generating of the first body shape and the second body shape may include generating a second body shape with respect to each of the plurality of second body sizes, and the displaying may include at least partially overlapping and displaying the first body shape and second body shapes of the plurality of second body sizes while displaying the first body shape in the first display format and displaying the second body shapes in different second display formats.

Advantageous Effects of Disclosure

According to the present disclosure, it is possible to visually examine whether clothing being produced may match the body of various sizes in the production stage of clothing.

In addition, according to the present disclosure, natural and practical clothing modeling is possible by providing a body size that is closes to the actual human body size among body sizes input by a user through comparison with a plurality of previously obtained human body models.

In addition, according to the present disclosure, a user may more easily create a body shape that is close to a shape of the actual human body.

In addition, according to the present disclosure, while a natural body shape that best matches a body size input by a user is provided, a body shape according to the body size input by the user is displayed together, and thus intuitive comparison between the two body sizes is possible.

BRIEF DESCRIPTION OF DRAWINGS

FIG. 6 is a diagram illustrating an interface for receiving a body size according to another embodiment of the present disclosure.

BEST MODE

Figure 1:
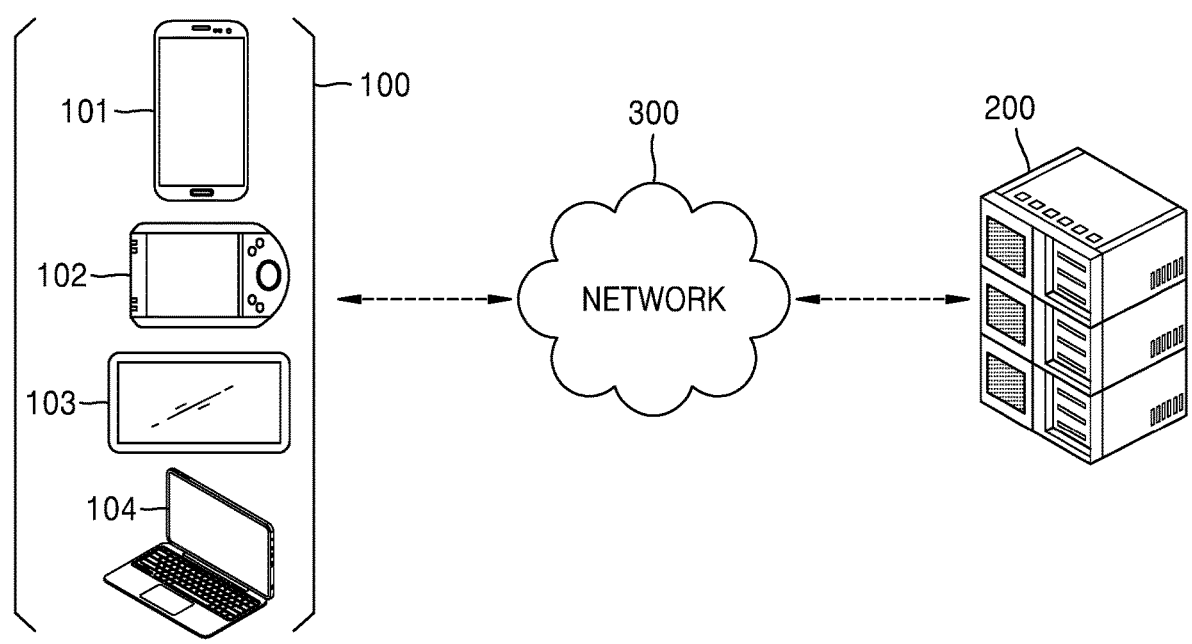
FIG. 1 is a diagram illustrating an example of a network environment according to an embodiment of the present disclosure.

According to an aspect of the present disclosure, a method of displaying a first body shape according to a body size input by a user and a second body shape according to a recommendation body size includes receiving a first body size for modeling of clothing from the user; determining a second body size similar to the first body size by using the first body size; generating a first body shape based on the first body size, and generating a second body shape based on the second body size; and displaying the first body shape and the second body shape.

Mode of Disclosure

The detailed description of the present disclosure to be described later refers to the accompanying drawings, which illustrate a specific embodiment in which the present disclosure may be practiced. These embodiments are described in detail sufficient to enable those skilled in the art to practice the present disclosure. It is to be understood that various embodiments of the present disclosure are different from each other but need not be mutually exclusive. For example, specific shapes, structures, and characteristics described herein may change from one embodiment to another and implemented without departing from the spirit and scope of the present disclosure. In addition, it should be understood that the positions or arrangements of individual elements in each embodiment may change without departing from the spirit and scope of the present disclosure. Therefore, the detailed description to be described below is not made in a limiting sense, and the scope of the present disclosure should be taken as encompassing the claimed scope of the claims and all scopes equivalent thereto. Like reference numerals in the drawings denote the same or similar elements over several aspects.

Hereinafter, various embodiments of the present disclosure will be described in detail with reference to the accompanying drawings in order to enable those skilled in the art to easily implement the present disclosure.

FIG. 1 is a diagram illustrating an example of a network environment according to an embodiment of the present disclosure. The network environment of FIG. 1 shows the example including a plurality of user terminals 101, 102, 103 and 104, a server 200 and a network 300. FIG. 1 is an example for describing the disclosure, and the number of user terminals or the number of servers is not limited as shown in FIG. 1.

The plurality of user terminals 101, 102, 103 and 104 may be fixed terminals implemented as computer devices or mobile terminals. Examples of the plurality of user terminals 101, 102, 103, and 104 include smart phones, mobile phones, navigation, computers, notebook computers, digital broadcasting terminals, personal digital assistants (PDAs), portable multimedia players (PMPs), tablet PCs, etc.

The plurality of user terminals 101, 102, 103, and 104 may communicate with each other and/or with the server 200 over the network 300 by using a wireless or wired communication method.

Meanwhile, the communication method of the plurality of user terminals 101, 102, 103, and 104 is not limited and may also include a communication method that utilizes a communication network (for example, a mobile communication network, wired Internet, wireless Internet, and a broadcasting network) that may include the network 300 as well as short range wireless communication between devices.

For example, the network 300 may include any one or more of networks among a personal area network (PAN), a local area network (LAN), a campus area network (CAN), a metropolitan area network (MAN), a wide area network (WAN), a broadband network (BBN), and the Internet.

In addition, the network 300 may include any one or more of network topologies, including bus networks, star networks, ring networks, mesh networks, star-bus networks, tree or hierarchical networks but is not limited thereto.

Hereinafter, for convenience of description, the plurality of user terminals 101, 102, 103, and 104 are referred to as and described a user terminal 100.

The server 200 may be implemented as a computer device or a plurality of computer devices that provide commands, codes, files, contents, services, etc. to the user terminal 100 through the network 300.

For example, the server 200 may provide a file for installing an application to the user terminal 100 accessed through the network 300. The user terminal 100 may install the application using a file provided from the server 200. In this case, the application may be an application for performing a three-dimensional (3D) modeling method of clothing.

In addition, the user terminal 100 may access the server 200 under the control of an operating system (OS) and at least one program (for example, a browser or an installed application) to receive services or contents provided by the server 200. For example, when the user terminal 100 requests pattern data through the network 300, the server 200 may transmit at least one pre-generated pattern data to the user terminal 100 in response to such a request. The user terminal 100 may display and provide the pattern data to a user according to the control of the application.

Figure 2:
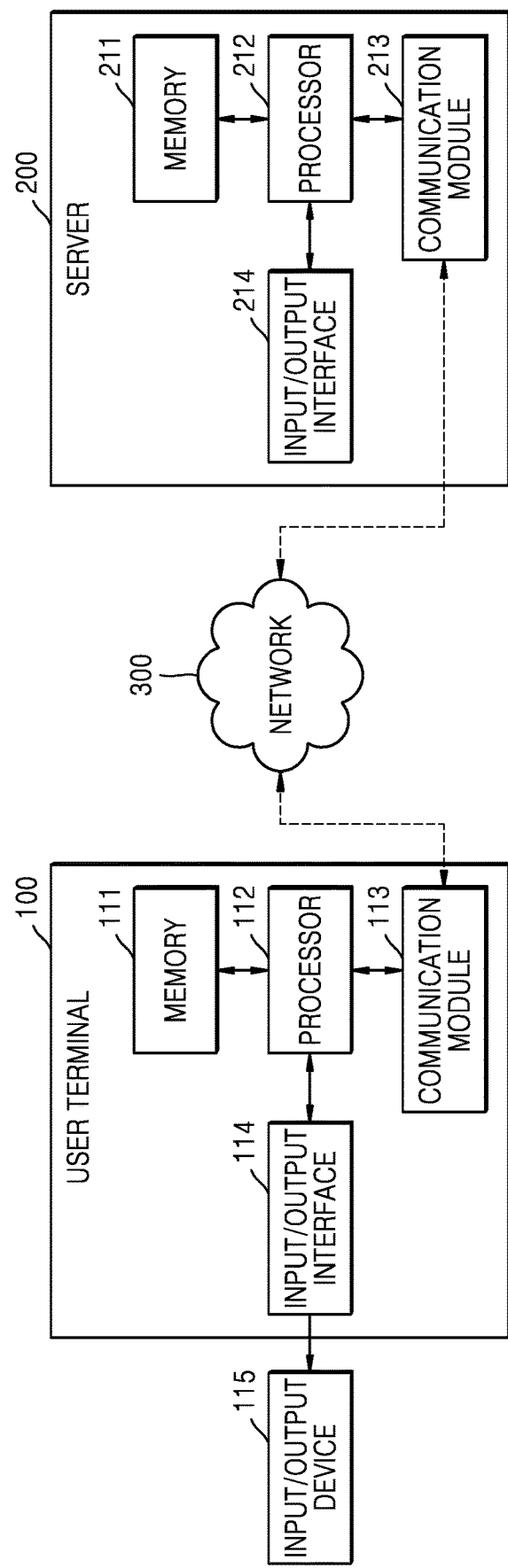
FIG. 2 is a block diagram for describing the internal configurations of a user terminal and a server according to an embodiment of the present disclosure.

FIG. 2 is a block diagram for describing the internal configurations of the user terminal 100 and the server 200 according to an embodiment of the present disclosure.

The user terminal 100 and the server 200 may respectively include memories 111 and 211, processors 112 and 212, communication modules 113 and 213, and input/output interfaces 114 and 214.

The memories 111 and 211 are computer-readable recording media, and may include permanent mass storage devices such as random access memory (RAM), read only memory (ROM), and a disk drive. In addition, the memory 111 and 211 may store an OS and at least one program code (for example, a code for 3D modeling of clothing installed and driven in the user terminal 100). These software components may be loaded from a computer-readable recording medium separate from the memories 111 and 211 using a drive mechanism. Such a separate computer-readable recording medium may include a computer-readable recording medium such as a floppy drive, a disk, a tape, a DVD/CD-ROM drive, a memory card, etc.

In another embodiment, the software components may be loaded into the memories 111 and 211 through the communication modules 113 and 213 rather than the computer-readable recording medium. For example, at least one program may be loaded into the memories 111 and 211 based on a program installed by files that are provided by developers or a file distribution system (for example, the server 200 described above) that distributes the installation file of the application through the network 300.

The processors 112 and 212 may be configured to process commands of a computer program by performing basic arithmetic, logic, and input/output operations. The commands may be provided to the processors 112 and 212 by the memories 111 and 211 or the communication modules 113 and 213. For example, the processors 112 and 212 may be configured to execute commands received according to a program code stored in a recording device such as the memories 111 and 211.

The communication modules 113 and 213 may provide functions for the user terminal 100 and the server 200 to communicate with each other through the network 300, and may provide functions to communicate with another user terminal (not shown) or another server (not shown). As an example, a request generated according to the program code that the processor 112 of the user terminal 100 stores in a recording device such as the memory 111 may be sent to the server 200 through the network 300 under the control of the communication module 113. To the contrary, control signals, commands, contents, files, etc. provided under the control of the processor 212 may be sent to the user terminal 100 via the communication module 213 and the network 300 through the communication module 113 of the user terminal 100.

The input/output interfaces 114 and 214 may be means for interfacing with an input/output device 115. In this regard, the input device may include a device such a keyboard or mouse, and the output device may include a device such as a display for displaying 3D modeled clothing.

As another example, the input/output interfaces 114 and 214 may be means for interfacing with a device such as a touch screen in which functions for input and output are integrated into one.

In addition, in other embodiments, the user terminal 100 and the server 200 may include more components than those of FIG. 2. However, there is no need to clearly show most of components of the related art. For example, the user terminal 100 may be implemented to include at least some of the above-described input/output device 115 or may further include other components such as a transceiver, a global positioning system (GPS) module, a camera, various sensors, database, etc.

Hereinafter, an example in which a body shape display method for modeling of clothing is performed by the processor 112 of the user terminal 100 will be described.

The processor 112 according to an embodiment of the present disclosure may generate pattern data of clothing based on a user input.

In the present disclosure, 'pattern data' of clothing may mean a data set including various information for producing clothing. For example, the pattern data may include at least one of form, dimension information, stitch information, material information, and landmark information of at least one part constituting clothing as an attribute.

In the present disclosure, the 'part' constituting clothing may mean at least a part of clothing used for producing the corresponding clothing. For example, the part may refer to a piece of fabric cut for the production of the corresponding clothing, or may refer to a button, zipper, or other member for combining used in the production of the corresponding clothing. However, this is merely exemplary and the spirit of the present disclosure is not limited thereto.

In the present disclosure, 'stitch information' is information for combining the above-described parts, and may mean information about seams of cut pieces of fabric. In this case, the stitch information may include not only information about a material used when combining parts, but also information about a usage type when combining the corresponding material. For example, when the stitch information is information about seams of the cut pieces of fabric, the stitch information may include information about the number of sewing stitches and information about the color, thickness, and material of threads used for sewing. In addition, the stitch information may include information about physical properties of combining such as a combining method between parts, combining elasticity, and combining strength. However, this is merely exemplary and the spirit of the present disclosure is not limited thereto.

In the present disclosure, 'material information' may include visual information of a material and physical property information of the material. In this case, the visual information of the material may include a color of the material, a pattern of the material, etc. Meanwhile, the information about the physical property of the material may include thickness, density, resilience, elasticity, breathability, abrasion property, and transparency of the material. However, the above-described material information is exemplary, and may be included in the material information of the present disclosure as long as it is a property capable of representing the unique characteristics of the material.

The processor 112 according to an embodiment of the present disclosure may receive such material information from a manufacturer server (not shown) of the material, or may receive the material information from another user terminal (not shown) and store the material information in the memory 111.

In the present disclosure, the 'landmark information' is position information of a part of clothing contacting the body when a person wears the clothing and may be plural. For example, when clothing is a T-shirt, the landmark information may include information about a shoulder part, a sleeve part, etc. of the clothing contacting the body. However, this is merely exemplary and the spirit of the present disclosure is not limited thereto.

The processor 112 according to an embodiment of the present disclosure may generate the aforementioned pattern data based on a user input.

In a selective embodiment, the processor 112 according to an embodiment of the present disclosure may obtain the above-described pattern data from an equipment that generates pattern data of clothing. In this case, the equipment that generates the pattern data of clothing may include, for example, a plurality of image sensors, at least one light source, and a distance sensor and generate the pattern data by scanning 3D information of clothing. However, the equipment that generates the pattern data as described above is exemplary, and the spirit of the present disclosure is not limited thereto.

Figure 3:
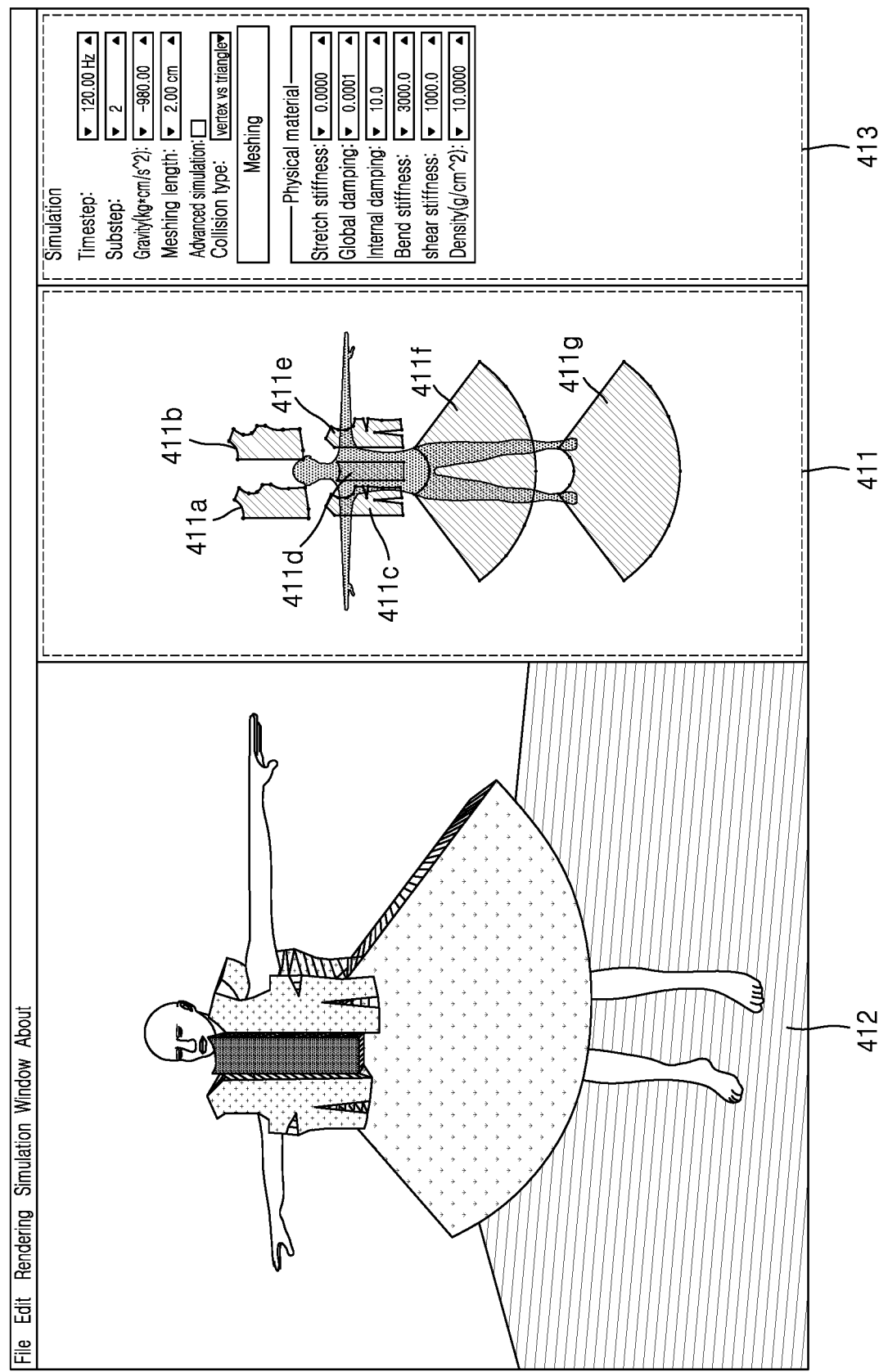
FIG. 3 is an example of a screen for generating pattern data.

FIG. 3 is an example of a screen 410 for generating pattern data.

Referring to FIG. 3, the screen 410 may include a region 411 for editing forms of parts 411*a* to 411*g* constituting clothing, a region 412 for displaying a shape of clothing in a three-dimensional (3D) space, and a region 413 for setting various setting values or setting attributes of the parts 411*a* to 411*g* or stitch information between the parts 411*a* to 411*g* when displaying clothing.

The processor 112 according to an embodiment of the present disclosure may generate the pattern data with respect to the corresponding clothing based on a user input through an interface such as the screen 410. For example, in the region 411 for editing the form of the part, a user may generate the pattern data of clothing by modifying the forms of the parts 411*a* to 411*g* or adding a new part in a two-dimensional (2D) space. Furthermore, in addition to the form of the part, the processor 112 may generate and/or edit the pattern data of clothing based on user inputs corresponding to various items constituting the pattern data of clothing.

The processor 112 may store a series of inputs and/or manipulations of the user for generating the pattern data of specific clothing in the memory 111. The processor 112 may transmit such pattern data to the server 200 and/or another user terminal (not shown) through the communication module 113.

The processor 112 according to an embodiment of the present disclosure may load the pattern data of clothing generated through the above-described process. At this time, 'loading' the pattern data may mean retrieving the pattern data from the memory 111 and/or the server 200 to make the corresponding pattern data display, editable and/or modifiable. For example, when a plurality of pattern data are generated through the above-described process, the pattern data may be loaded by a user selection of any one of a plurality of pattern data stored in the memory 111. In addition, the pattern data may be loaded by the user downloading specific pattern data from the server 200. However, this is merely exemplary and the spirit of the present disclosure is not limited thereto.

The processor 112 according to an embodiment of the present disclosure may load body data for a body on which clothing corresponding to the pattern data is to be put, similarly to loading of the pattern data. In this case, the 'body data' may include information about at least one of the size of the body, the ratio of each part, race, gender, and skin color. Also, the processor 112 according to an embodiment of the present disclosure may modify at least one of the above-described items included in the body data based on a body data modification input of the user. For example, the processor 112 may modify information about the gender included in the body data from male to female based on a user input of modifying the gender from male to female. In addition, the processor 112 may change the size of each part included in the body data based on a size adjustment input for each part of the user's body.

The processor 112 according to an embodiment of the present disclosure may display a stereoscopic shape of the corresponding clothing based on the pattern data of clothing loaded by the above-described process. In this case, the stereoscopic shape may mean a form in the 3D space of clothing based on the pattern data.

Meanwhile, the processor 112 according to an embodiment of the present disclosure may display the stereoscopic shape of clothing in consideration of the pattern data and the separately loaded body data. In other words, the processor 112 according to an embodiment of the present disclosure may display the stereoscopic shape of clothing based on the body data and the pattern data.

Figure 4:
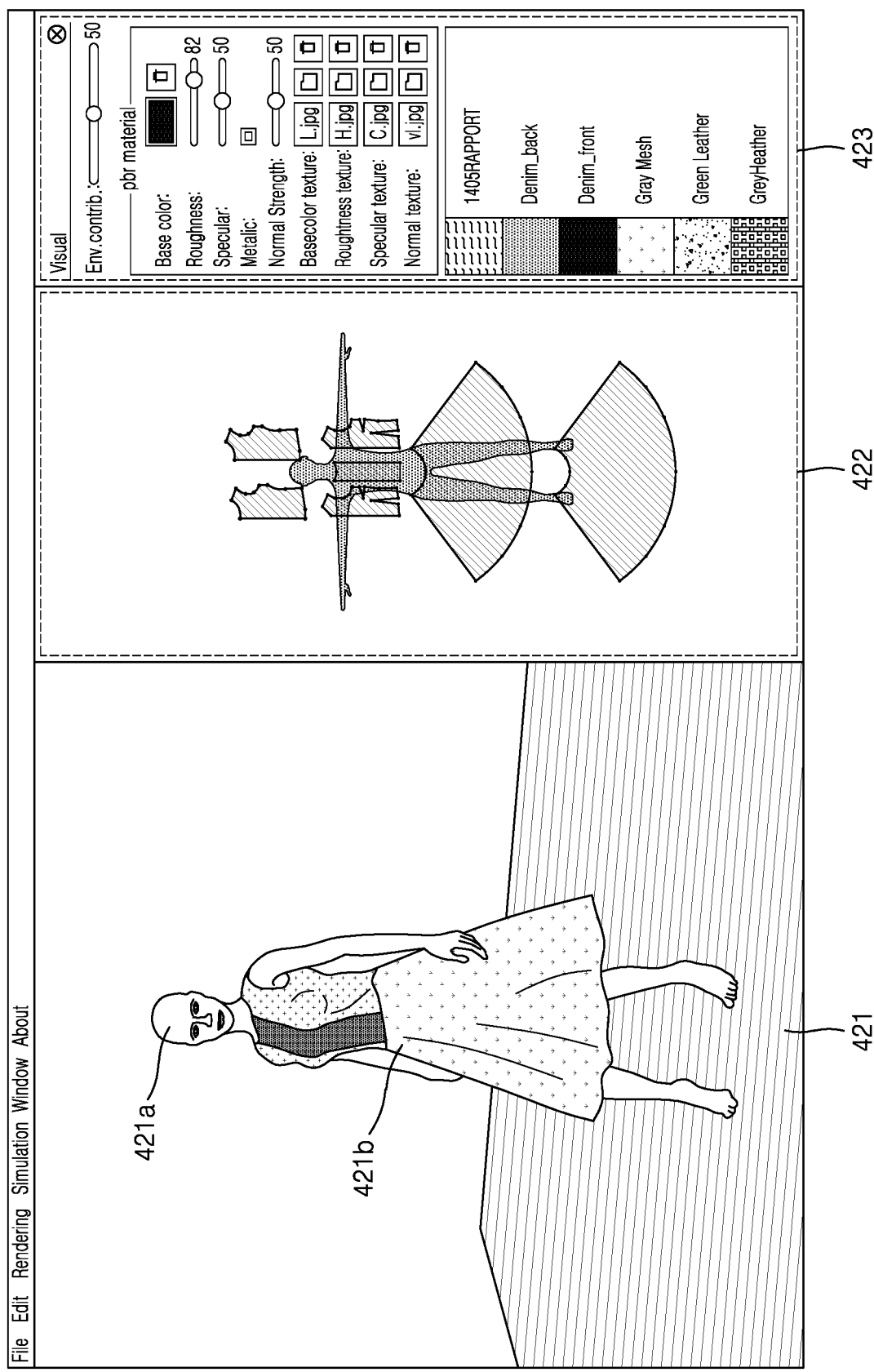
FIG. 4 is an example of a screen for displaying a stereoscopic shape of clothing.

FIG. 4 is an example of a screen 420 displaying a stereoscopic shape of clothing.

Similar to FIG. 3, the screen 420 may include a region 421 for displaying a shape in a 3D space of clothing, a region 422 for displaying or editing forms of parts constituting clothing, and a region 423 for setting various setting values when displaying clothing.

The processor 112 according to an embodiment of the present disclosure may display a 3D shape 421*a* of a body based on body data and a 3D shape 421*b* of clothing in consideration of the 3D shape 421*a* of the body on the region 421 for displaying the shape in the 3D space of clothing.

As described above, the processor 112 according to an embodiment of the present disclosure may consider the 3D shape 421*a* of the body when displaying the 3D shape 421*b* of clothing.

To this end, the processor 112 according to an embodiment of the present disclosure may receive a first body size which is a body size for modeling of clothing from the user.

Figure 5:
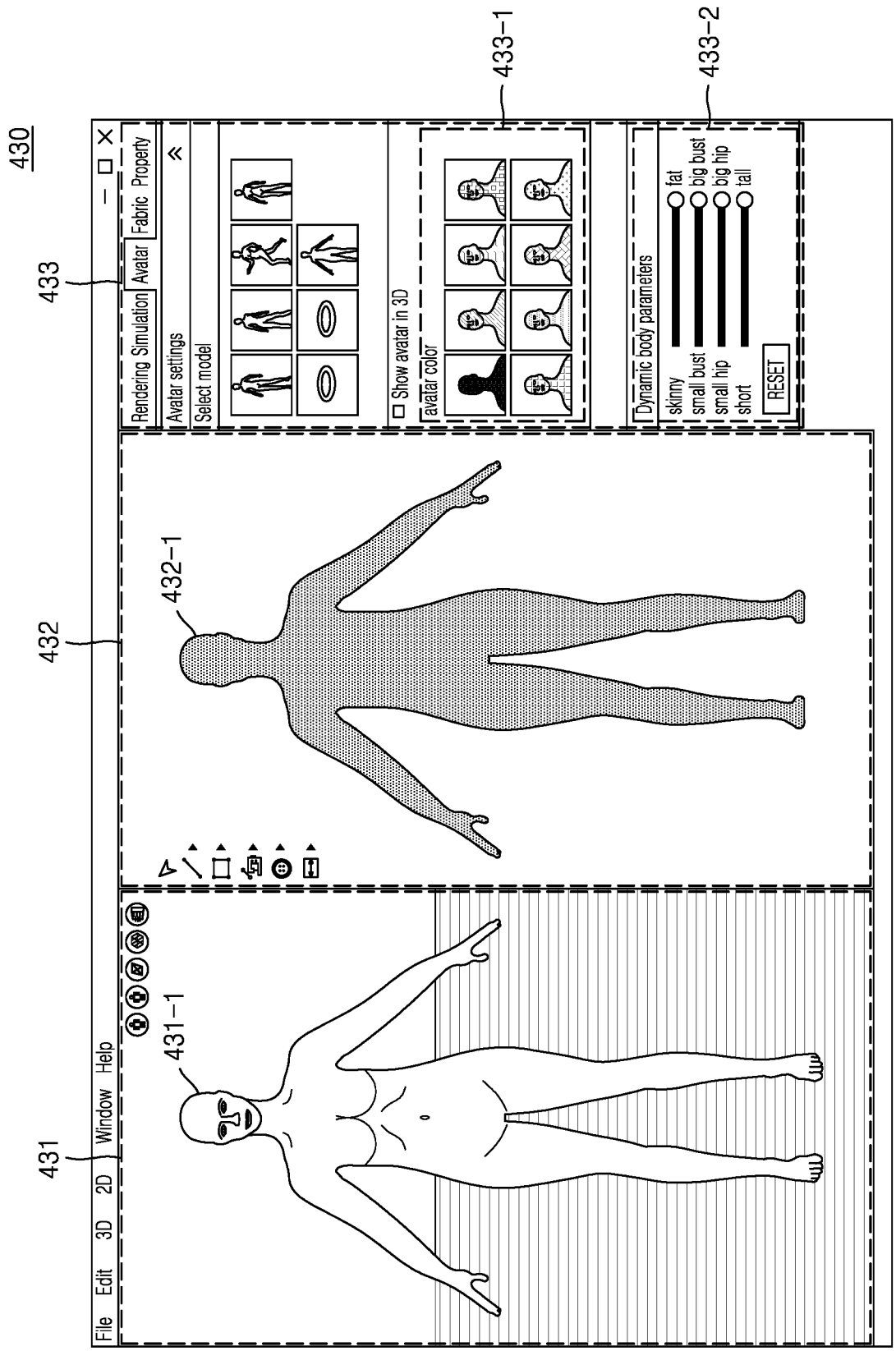
FIG. 5 is an example of a screen on which an interface for receiving a body size is displayed.

FIG. 5 is an example of a screen 430 on which an interface 433-2 for receiving a body size is displayed. At this time, the screen 430 may include a region 431 for displaying the 3D shape 431-1 of the body, a region 432 for displaying a two-dimensional (2D) shape 432-1 of the body at a specific angle, and a region 433 on which an interface for adjusting the body size is displayed.

In an embodiment of the present disclosure, the region 433 on which the interface is displayed may include an interface 433-1 for adjusting a body color and the interface 433-2 for receiving the body size.

In an embodiment of the present disclosure, the 'body size' such as the first body size may include one or more size items determining the shape of the body in a 3D space. For example, the body size may include items respectively corresponding to a fatness, a chest size, a hip size, and a height. However, above-described items are exemplary and the spirit of the present disclosure is not limited thereto.

In an embodiment of the present disclosure, the interface 433-2 may include an interface for setting each of the one or more size items included in the body size. For example, as illustrated in FIG. 5, the interface 433-2 may include a slider interface capable of adjusting a size according to a position movement of a knob with respect to each of the one or more size items. For example, when the user moves the knob on a slider with respect to a 'hip' item toward a 'big hip', the processor 112 may obtain an increased hip size according to a user input. However, the interface 433-2 is exemplary, and an interface capable of adjusting a value of each individual item according to the manipulation of the user may correspond to the interface of the present disclosure, in addition to the slider interface.

When the value of the item for adjusting the body size changes according to the user input, the processor 112 according to the embodiment of the present disclosure may reflect this change and display a 3D shape of the body. For example, as in the above-described example, when the user moves the knob on the slider with respect to the 'hip' item toward the 'big hip', the processor 112 may display the 3D shape of the body having the increased hip according to the user input on the region 431.

FIG. 6 is a diagram illustrating an interface 610 for receiving a body size according to another embodiment of the present disclosure.

In another embodiment of the present disclosure, the processor 112 may receive a size according to one or more size items and also receive a degree of freedom for modification of the one or more items. In this case, the 'degree of freedom for deformation' may include whether to modify the item or may include a degree of modifiability. The user may obtain a second body shape more suitable for his or her intention by inputting the size of each item, whether to modify each item, and/or a degree of modification of each item. A description of the processor 112 that determines the second body size and displays the second body shape will be given later.

In another embodiment of the present disclosure, the interface 610 may include an interface 611 for receiving whether to modify each item. For example, as shown in FIG. 6, the processor 112 may set a height item (an item for setting short-tall) to be unmodifiable in the interface 611 such that the height item does change when determining the second body size. However, the interface 611 is exemplary, and the spirit of the present disclosure is not limited thereto. In an embodiment in which the degree of modification is input, an interface may be provided to input the degree of modification.

The processor 112 according to an embodiment of the present disclosure may determine the second body size similar to the first body size by using the first body size input by the user. In the present disclosure, the 'second body size' may mean a body size that is more natural than the first body size input by the user or is closer to the actual human body.

Figure 7:
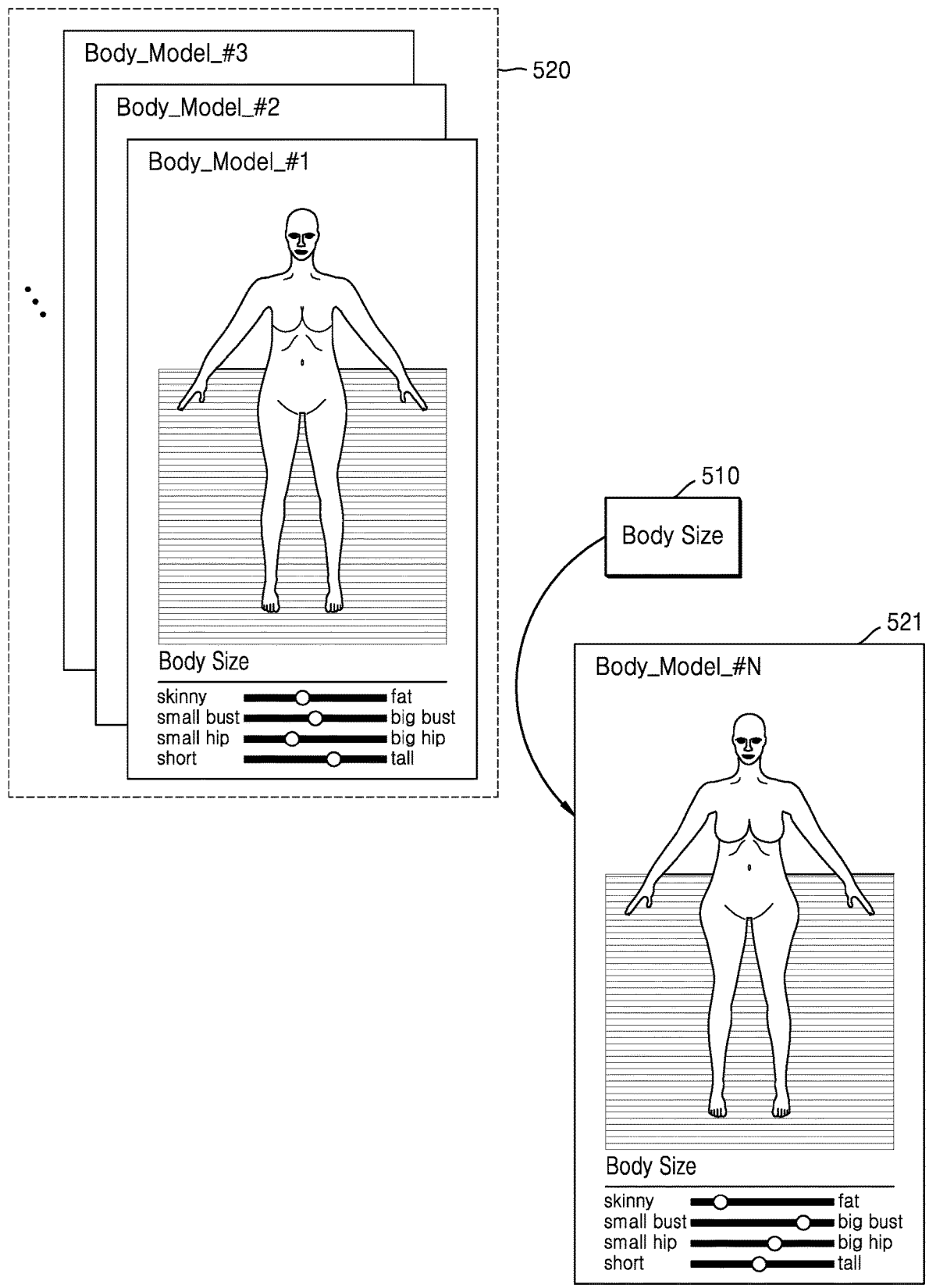
FIG. 7 is a diagram for describing a process in which a processor determines a second body size according to an embodiment of the present disclosure.

FIG. 7 is a diagram for describing a process in which the processor 112 determines a second body size according to an embodiment of the present disclosure.

The processor 112 according to an embodiment of the present disclosure may compare sizes of a plurality of human body models 520 with a first body size 510 input by a user and select a human body model 521 whose size similarity to the first body size 510 satisfies a predetermined condition from among the plurality of human body models 520. Also, the processor 112 may determine a body size of the selected human body model 521 as the second body size.

In this case, the processor 112 according to an embodiment of the present disclosure may determine the size similarity in various ways. For example, the processor 112 may determine that the similarity is higher as a difference between one or more size items included in the body size is smaller, and the similarity is higher as the sum of difference values to which a weight is applied is smaller in consideration of the weight of each item. However, such similarity calculation methods are exemplary, and the spirit of the present disclosure is not limited thereto.

Meanwhile, the 'predetermined condition' may be, for example, a condition for selecting a human body model of the highest similarity, but the spirit of the present disclosure is not limited thereto.

In the present disclosure, the plurality of human body models 520 are previously created models based on the body size of an actual human and may be models for correcting the body size input by the user to be close to the actual human. For example, when a user selects a size of any one item among one or more size items as an extreme value or inputs input values of multiple items to contradict each other, the corresponding body size may not have much meaning with respect to modeling of clothing.

The present disclosure provides a body size that is the closes to the body size of the actual human among body sizes input by the user through comparison with the plurality of previously obtained human body models 520, thereby enabling natural and practical modeling of clothing.

In the present disclosure, the plurality of human body models 520 may be collected and created differently for each race, country, age group, and gender, and a model selected by the user may be used to determine the second body size.

In another embodiment of the present disclosure, the processor 112 may determine the second body size by referring to a degree of freedom for modification of each of the one or more size items included in the first body size 510 together with the first body size 510 input by the user. For example, as in the example described with reference to FIG. 6, when the user sets the height item to be unmodifiable in the interface 611, the processor 112 may cause the height item not to change when determining the second body size. When the degree of modifiability is input together with the size, the processor 112 may determine the second body size by referring to the degree of modifiability.

In a selective embodiment, the processor 112 according to an embodiment of the present disclosure may refer to the plurality of human body models 520 to provide a recommendation range of values of the remaining items according to a user input with respect to any one size item included in the first body size 510.

Figure 8:
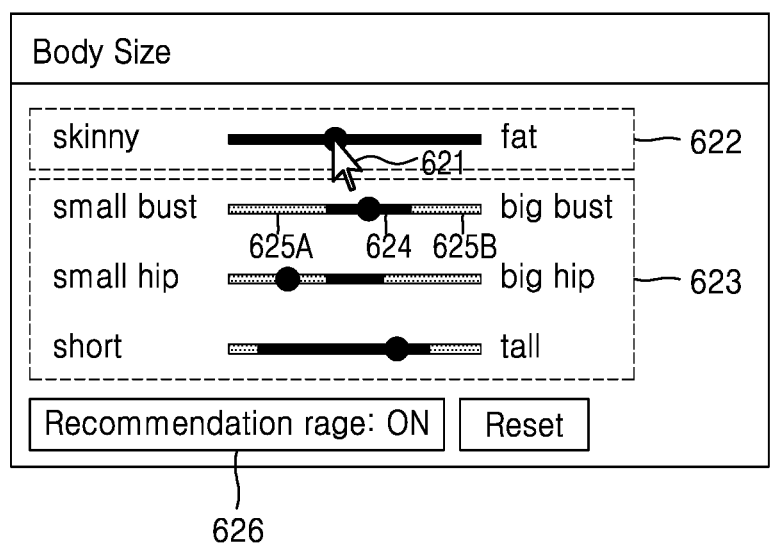
FIG. 8 is a diagram illustrating an interface for receiving a body size according to a selective embodiment of the present disclosure.

FIG. 8 is a diagram illustrating an interface 620 for receiving a body size according to a selective embodiment of the present disclosure. For convenience of description, it is assumed that a user moves a position of a knob of a fatness item 622 with a mouse cursor 621.

Under the above-described assumption, the processor 112 according to an embodiment of the present disclosure may calculate, update and provide a recommendation movement range with respect to remaining items 623 excluding the fatness item 622. For example, the processor 112 may distinguish and display the recommendation movement range 624 and remaining ranges 625A and 625B on a slider for adjusting a chest size item according to the movement of the knob with respect to the fatness item 622. The recommendation movement range 624 and the remaining ranges 625A and 625B may be newly updated and provided according to the position movement of the knob with respect to the fatness item 622.

In this case, the provided ranges 624, 625A, and 625B may be determined by the processor 112 based on a size value determined with respect to the corresponding item according to the plurality of human body models 520 and the position movement of the knob with respect to the fatness item 622.

This may allow the user of the present disclosure to more easily create a body shape that is close to the shape of the actual human body.

The processor 112 according to an embodiment of the present disclosure may generate a first body shape based on a first body size, and may generate a second body shape based on a second body size. In addition, the generated first body shape and second body shape may be displayed. In this case, the processor 112 may at least partially overlap and display the first body shape and the second body shape and display the two body shapes in a display format in which the two body shapes are distinguished from each other. For example, the first body shape may be displayed using a solid line, and the second body shape may be displayed using a dotted line (or dots). However, such a display method is exemplary, and the spirit of the present disclosure is not limited thereto.

In addition, the processor 112 may match and display the central axis of the first body shape and the central axis of the second body shape to facilitate comparison between the two body shapes.

In a selective embodiment, the processor 112 according to an embodiment of the present disclosure may determine a plurality of second body sizes, generate a 3D shape of each of the plurality of second body sizes, and display the 3D shape together with the first body shape. In this case, the processor 112 may display the plurality of second body shapes in different display formats such that the plurality of second body shapes may be distinguished.

Figure 9:
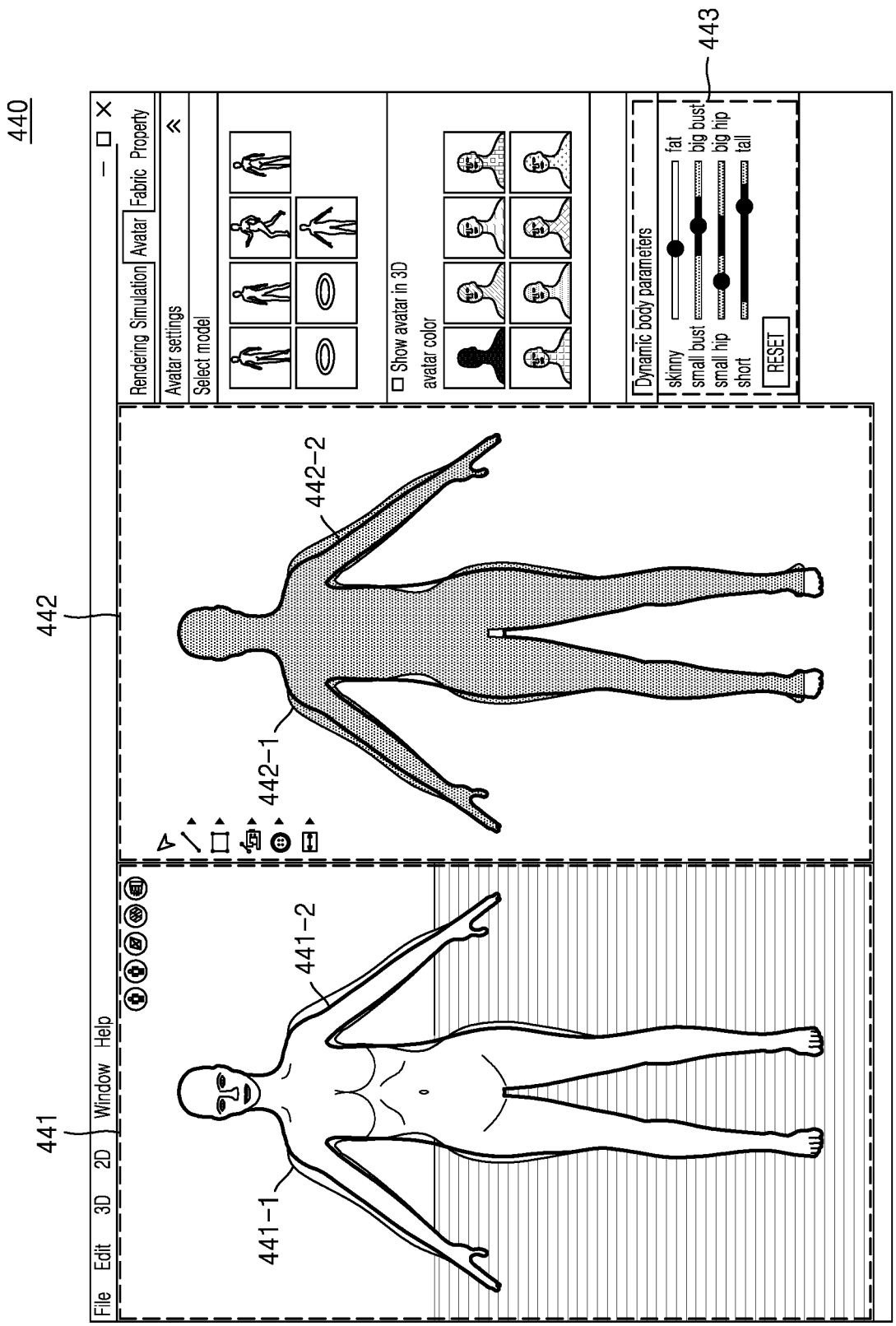
FIG. 9 is an example of a screen on which a first body shape and a second body shape are displayed together.

FIG. 9 is an example of a screen 440 on which a first body shape 441-1 and a second body shape 441-2 are displayed together. At this time, the screen 440 may include a region 441 for displaying the first and second 3D body shapes 441-1 and 441-2, a region 442 for displaying 2D body shapes 442-1 and 442-2 at a specific angle, and a region 433 on which an interface for adjusting the body size is displayed.

As described above, the processor 112 may display the first body shape 441-1 based on a first body size input by a user and the second body shape 441-2 which is a body shape created from a human body model in different display methods. The processor 112 may also display the 2D body shapes 442-1 and 442-2 with respect to the first and second 3D body shapes 441-1 and 441-2, respectively. Accordingly, the present disclosure may provide a natural body shape that most closely matches the body size input by the user and display the body shape according to the body size input by the user together, thereby enabling intuitive comparison between the two body shapes The processor 112 according to an embodiment of the present disclosure may overlap and display a 3D shape of clothing on the first body shape 441-1 and/or the second body shape 441-2 displayed according to the manipulation of the user. Accordingly, the present disclosure may provide the 3D shape of clothing based on the body size input by the user.

Figure 10:
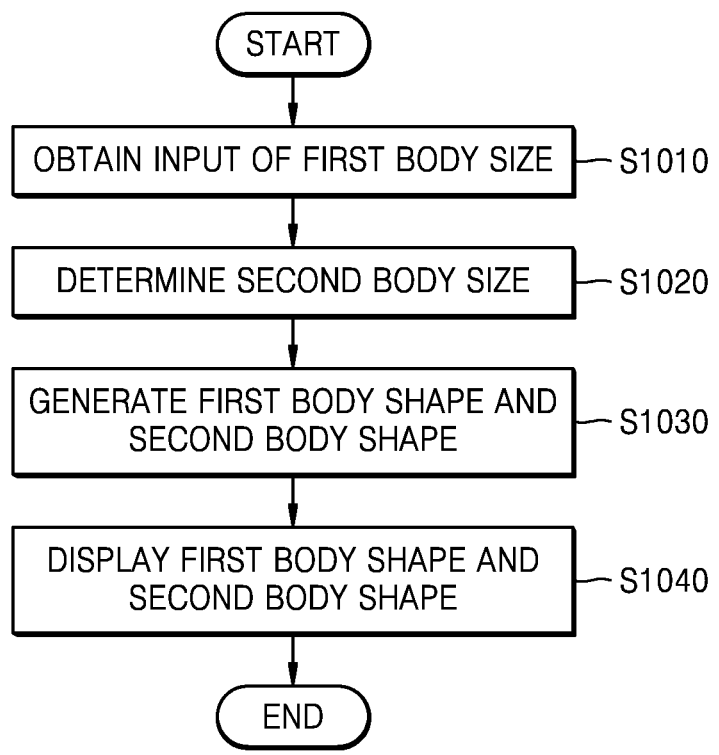
FIG. 10 is a flowchart illustrating a body shape display method for modeling of clothing performed by a user terminal according to an embodiment of the present disclosure.

FIG. 10 is a flowchart illustrating a body shape display method for modeling of clothing performed by the user terminal 100 according to an embodiment of the present disclosure. Hereinafter, descriptions of FIG. 10 redundant with those in FIGS. 1 to 9 will be omitted, and FIG. 10 will be described with reference to FIGS. 1 to 9 together.

The user terminal 100 according to an embodiment of the present disclosure may receive a first body size which is a body size for modeling of clothing from a user.(S1010)

FIG. 5 is an example of the screen 430 on which the interface 433-2 for receiving a body size is displayed. At this time, the screen 430 may include the region 431 for displaying the 3D shape 431-1 of the body, the region 432 for displaying the 2D shape 432-1 of the body at a specific angle, and the region 433 on which an interface for adjusting the body size is displayed.

In an embodiment of the present disclosure, the region 433 on which the interface is displayed may include an interface 433-1 for adjusting a body color and the interface 433-2 for receiving the body size.

In an embodiment of the present disclosure, the 'body size' such as the first body size may include one or more size items determining the shape of the body in a 3D space. For example, the body size may include items respectively corresponding to a fatness, a chest size, a hip size, and a height. However, above-described items are exemplary and the spirit of the present disclosure is not limited thereto.

In an embodiment of the present disclosure, the interface 433-2 may include an interface for setting each of the one or more size items included in the body size. For example, as illustrated in FIG. 5, the interface 433-2 may include a slider interface capable of adjusting a size according to a position movement of a knob with respect to each of the one or more size items. For example, when the user moves the knob on a slider with respect to a 'hip' item toward a 'big hip', the user terminal 100 may obtain an increased hip size according to a user input. However, the interface 433-2 is exemplary, and an interface capable of adjusting a value of each individual item according to the manipulation of the user may correspond to the interface of the present disclosure, in addition to the slider interface.

When the value of the item for adjusting the body size changes according to the user input, the user terminal 100 according to the embodiment of the present disclosure may reflect this change and display a 3D shape of the body. For example, as in the above-described example, when the user moves the knob on the slider with respect to the 'hip' item toward the 'big hip', the user terminal 100 may display the 3D shape of the body having the increased hip according to the user input on the region 431.

FIG. 6 is a diagram illustrating the interface 610 for receiving a body size according to another embodiment of the present disclosure.

In another embodiment of the present disclosure, the user terminal 100 may receive a size according to one or more size items and also receive a degree of freedom for modification of the one or more items. In this case, the 'degree of freedom for deformation' may include whether to modify the item or may include a degree of modifiability. The user may obtain a second body shape more suitable for his or her intention by inputting the size of each item, whether to modify each item, and/or a degree of modification of each item. A description of the user terminal 100 that determines the second body size and displays the second body shape will be given later.

In another embodiment of the present disclosure, the interface 610 may include the interface 611 for receiving whether to modify each item. For example, as shown in FIG. 6, the user terminal 100 may set a height item (an item for setting short-tall) to be unmodifiable in the interface 611 such that the height item does change when determining the second body size. However, the interface 611 is exemplary, and the spirit of the present disclosure is not limited thereto. In an embodiment in which the degree of modification is input, an interface may be provided to input the degree of modification.

The user terminal 100 according to an embodiment of the present disclosure may determine the second body size similar to the first body size by using the first body size input by the user.(S1020) In the present disclosure, the 'second body size' may mean a body size that is more natural than the first body size input by the user or is closer to the actual human body.

FIG. 7 is a diagram for describing a process in which the processor 112 determines a second body size according to an embodiment of the present disclosure.

The user terminal 100 according to an embodiment of the present disclosure may compare sizes of the plurality of human body models 520 with the first body size 510 input by a user and select the human body model 521 whose size similarity to the first body size 510 satisfies a predetermined condition from among the plurality of human body models 520. Also, the user terminal 100 may determine a body size of the selected human body model 521 as the second body size.

In this case, the user terminal 100 according to an embodiment of the present disclosure may determine the size similarity in various ways. For example, the user terminal 100 may determine that the similarity is higher as a difference between one or more size items included in the body size is smaller, and the similarity is higher as the sum of difference values to which a weight is applied is smaller in consideration of the weight of each item. However, such similarity calculation methods are exemplary, and the spirit of the present disclosure is not limited thereto.

Meanwhile, the 'predetermined condition' may be, for example, a condition for selecting a human body model of the highest similarity, but the spirit of the present disclosure is not limited thereto.

In the present disclosure, the plurality of human body models 520 are previously created models based on the body size of an actual human and may be models for correcting the body size input by the user to be close to the actual human. For example, when a user selects a size of any one item among one or more size items as an extreme value or inputs input values of multiple items to contradict each other, the corresponding body size may not have much meaning with respect to modeling of clothing.

The present disclosure provides a body size that is the closes to the body size of the actual human among body sizes input by the user through comparison with the plurality of previously obtained human body models 520, thereby enabling natural and practical modeling of clothing.

In the present disclosure, the plurality of human body models 520 may be collected and created differently for each race, country, age group, and gender, and a model selected by the user may be used to determine the second body size.

In another embodiment of the present disclosure, the user terminal 100 may determine the second body size by referring to a degree of freedom for modification of each of the one or more size items included in the first body size 510 together with the first body size 510 input by the user. For example, as in the example described with reference to FIG. 6, when the user sets the height item to be unmodifiable in the interface 611, the processor 112 may cause the height item not to change when determining the second body size. When the degree of modifiability is input together with the size, the user terminal 100 may determine the second body size by referring to the degree of modifiability.

In a selective embodiment, the user terminal 100 according to an embodiment of the present disclosure may refer to the plurality of human body models 520 to provide a recommendation range of values of the remaining items according to a user input with respect to any one size item included in the first body size 510.

FIG. 8 is a diagram illustrating the interface 620 for receiving a body size according to a selective embodiment of the present disclosure. For convenience of description, it is assumed that a user moves a position of a knob of the fatness item 622 with the mouse cursor 621.

Under the above-described assumption, the user terminal 100 according to an embodiment of the present disclosure may calculate, update and provide a recommendation movement range with respect to the remaining items 623 excluding the fatness item 622. For example, the user terminal 100 may distinguish and display the recommendation movement range 624 and the remaining ranges 625A and 625B on a slider for adjusting a chest size item according to the movement of the knob with respect to the fatness item 622. The recommendation movement range 624 and the remaining ranges 625A and 625B may be newly updated and provided according to the position movement of the knob with respect to the fatness item 622.

In this case, the provided ranges 624, 625A, and 625B may be determined by the user terminal 100 based on a size value determined with respect to the corresponding item according to the plurality of human body models 520 and the position movement of the knob with respect to the fatness item 622.

This may allow the user of the present disclosure to more easily create a body shape that is close to the shape of the actual human body.

The user terminal 100 according to an embodiment of the present disclosure may generate a first body shape based on a first body size, and may generate a second body shape based on a second body size.(S1030) In addition, the generated first body shape and second body shape may be displayed.(S1040) In this case, the user terminal 100 may at least partially overlap and display the first body shape and the second body shape and display the two body shapes in a display format in which the two body shapes are distinguished from each other. For example, the first body shape may be displayed using a solid line, and the second body shape may be displayed using a dotted line (or dots). However, such a display method is exemplary, and the spirit of the present disclosure is not limited thereto.

In addition, the user terminal 100 may match and display the central axis of the first body shape and the central axis of the second body shape to facilitate comparison between the two body shapes.

In a selective embodiment, the user terminal 100 according to an embodiment of the present disclosure may determine a plurality of second body sizes, generate a 3D shape of each of the plurality of second body sizes, and display the 3D shape together with the first body shape. In this case, the user terminal 100 may display the plurality of second body shapes in different display formats such that the plurality of second body shapes may be distinguished.

FIG. 9 is an example of the screen 440 on which the first body shape 441-1 and the second body shape 441-2 are displayed together. At this time, the screen 440 may include the region 441 for displaying the first and second 3D body shapes 441-1 and 441-2, the region 442 for displaying the 2D body shapes 442-1 and 442-2 at a specific angle, and the region 433 on which an interface for adjusting the body size is displayed.

As described above, the user terminal 100 may display the first body shape 441-1 based on a first body size input by a user and the second body shape 441-2 which is a body shape created from a human body model in different display methods. The user terminal 100 may also display the 2D body shapes 442-1 and 442-2 with respect to the first and second 3D body shapes 441-1 and 441-2, respectively. Accordingly, the present disclosure may provide a natural body shape that most closely matches the body size input by the user and display the body shape according to the body size input by the user together, thereby enabling intuitive comparison between the two body shapes The user terminal 100 according to an embodiment of the present disclosure may overlap and display a 3D shape of clothing on the first body shape 441-1 and/or the second body shape 441-2 displayed according to the manipulation of the user. Accordingly, the present disclosure may provide the 3D shape of clothing based on the body size input by the user.

The device described above may be realized as hardware elements, software elements, and/or the combination of hardware elements and software elements. For example, the device and the components described in the embodiments may be realized by using, for example, a processor, an arithmetic logic unit (ALU), a digital signal processor, a microcomputer, a field programmable gate array (FPGA), a programmable logic unit (PLU), a microprocessor, or one or more general-purpose computers or special-purpose computers, such as a device capable of executing and responding to instructions. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described embodiments may be recorded in non-transitory computer-readable media including program instructions to implement various operations embodied by a computer. The non-transitory computer-readable media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

As described above, although the embodiments have been described by the limited embodiment and drawings, it will be apparent to one of ordinary skill in the art that various changes in form and details may be made in these examples without departing from the spirit and scope of the claims and their equivalents. For example, suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A method of displaying a first body shape according to a body size input by a user and a second body shape according to a recommendation body size, the method comprising:
    receiving, by a processor of a user terminal, a first body size for modeling of clothing from the user;
    determining, by the processor of the user terminal, a second body size similar to the first body size by using the first body size;
    generating, by the processor of the user terminal, a first body shape based on the first body size, and generating a second body shape based on the second body size;
    based on the generated first body shape and generated second body shape,
        displaying, by the processor, in a first display region on a display device of the user terminal, a first 3D body shape and a second 3D body shape concurrently, in an overlapping manner, and in a manner that the first 3D body shape is distinguishable from the second 3D body shape, and
        displaying, by the processor, in a second display region on the display device of the user terminal, a first 2D body shape and a second 2D body shape with respect to the first and second 3D body shapes, wherein the first 2D body shape and the second 2D body shape are displayed concurrently, in an overlapping manner, and in a manner that the first 2D body shape is distinguishable from the second 2D body shape.

2. The method of claim 1, wherein the determining of the second body size comprises:
    comparing sizes of a plurality of human body models with the first body size and selecting a human body model whose size similarity to the first body size satisfies a predetermined condition from among the plurality of human body models; and
    determining a body size of the selected human body model as a second body size.

3. The method of claim 1, wherein the first body size comprises one or more size items that determine a shape of the body, wherein the receiving of the first body size comprises:
    receiving a size according to the one or more size items; and
    receiving a degree of freedom for modification of the one or more items, wherein the degree of freedom for modification is a degree of modifiability of each size of the one or more items when determining the second body size, and the determining of the second body size comprises:

determining the second body size by referring to the size according to the one or more size items and the degree of freedom for modification.

4. The method of claim 1, wherein the first body size comprises one or more size items that determine a shape of the body, wherein the receiving of the first body size comprises:

providing an interface for setting each of the one or more size items.

5. The method of claim 4, wherein the interface comprises a slider interface including a plurality of knobs, each knob being associated with a respective size item from a plurality of size items, wherein the slider interface is configured to adjust the size with respect to each of the plurality of size items, wherein the receiving of the first body size comprises:

according to the position movement of a particular knob with respect to a particular size item, updating and providing a recommendation movement range of the remaining knobs on the slider interface with respect to remaining size items.

* * * * *